(12) United States Patent
Nikuie et al.

(10) Patent No.: US 12,321,599 B2
(45) Date of Patent: Jun. 3, 2025

(54) PROTOCOL AGNOSTIC CONTROL OF NAND FLASH

(71) Applicant: Microchip Technology Incorporated, Chandler, AZ (US)

(72) Inventors: Nima Nikuie, San Francisco, CA (US); Jack Wynne, Los Altos, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 215 days.

(21) Appl. No.: 18/146,715

(22) Filed: Dec. 27, 2022

(65) Prior Publication Data

US 2023/0214121 A1    Jul. 6, 2023

Related U.S. Application Data

(60) Provisional application No. 63/296,626, filed on Jan. 5, 2022.

(51) Int. Cl.
*G06F 3/06* (2006.01)

(52) U.S. Cl.
CPC ............ *G06F 3/061* (2013.01); *G06F 3/0659* (2013.01); *G06F 3/0679* (2013.01)

(58) Field of Classification Search
CPC ....... G06F 3/061; G06F 3/0659; G06F 3/0679
See application file for complete search history.

(56) References Cited

U.S. PATENT DOCUMENTS

| | | | |
|---|---|---|---|
| 2003/0131185 A1* | 7/2003 | Dover | G11C 16/102 711/103 |
| 2003/0137884 A1 | 7/2003 | Roohparvar | 365/200 |
| 2016/0179388 A1* | 6/2016 | Huang | G06F 13/1668 711/104 |
| 2019/0018597 A1* | 1/2019 | Zhang | G06F 3/0611 |
| 2020/0057584 A1 | 2/2020 | Chen | |

OTHER PUBLICATIONS

International Search Report and Written Opinion, Application No. PCT/US2023/010077, 20 pages.

* cited by examiner

*Primary Examiner* — Eric Cardwell
(74) *Attorney, Agent, or Firm* — SLAYDEN GRUBERT BEARD PLLC (57) ABSTRACT

An apparatus and method including a command input to receive a command with a macro identifier from a channel processor, a macro memory storing a plurality of flash control commands, each comprising a duration and a plurality of target control values to control a flash target; and a second finite state machine comprising a plurality of control outputs each corresponding control inputs on the flash target, wherein in response to a received command, the first finite state machine locates in the macro memory a sequence of flash control commands associated with the macro identifier and sequentially outputs the flash control commands to the second finite state machine; and wherein the second finite state machine drives each of the plurality of control outputs based on corresponding values in the first flash control command for the duration specified in the current flash control command.

20 Claims, 6 Drawing Sheets

| # | cs | odt | sdr | numrd | time | dq | wp | dqoe | dqsoe | dqs | re | we | cle | ale |
|---|---|---|---|---|---|---|---|---|---|---|---|---|---|---|
| 0 | 0 | 0 | 0 | 0 | tCS-tCALS | 0 | 0 | 0 | 0 | 0 | 1 | 1 | 0 | 0 |
| 1 | 0 | 0 | 0 | 0 | tCALS-tWP | 0 | 0 | 0 | 0 | 0 | 1 | 0 | 0 | 1 |
| 2 | 0 | 0 | 0 | 0 | tCAS | addr | 0 | 1 | 0 | 0 | 1 | 0 | 0 | 1 |
| 3 | 0 | 0 | 0 | 0 | tCAH | addr | 0 | 1 | 0 | 0 | 1 | 1 | 0 | 1 |
| 4 | 0 | 0 | 0 | 0 | tCH-tCAH | 0 | 0 | 0 | 0 | 0 | 1 | 1 | 0 | 1 |
| 5 | 1 | 0 | 0 | 0 | tCSD | 0 | 0 | 0 | 0 | 0 | 1 | 1 | 0 | 1 |

PROTOCOL AGNOSTIC CONTROL OF NAND FLASH

RELATED PATENT APPLICATION

This application claims priority to commonly owned U.S. Provisional Patent Application No. 63/296,626, filed on Jan. 5, 2022, which is hereby incorporated by reference.

FIELD OF THE INVENTION

The present application relates to systems and methods for controlling flash targets.

BACKGROUND

Flash storage devices offer high throughput, low latency and long term storage of computer data. Flash storage controllers sequence commands to flash storage devices to accomplish burst reads, burst writes, and control commands.

SUMMARY

In some examples, an apparatus is provided comprising a first finite state machine comprising a command input to receive a command from a channel processor, the command comprising a macro identifier. The apparatus comprises a macro memory to store a plurality of flash control commands, each flash control command comprising a plurality of target control values to control a flash target and a duration. And the apparatus comprises a second finite state machine comprising a plurality of control outputs each of which corresponds to one of a plurality of control inputs on the flash target. In response to a received command, the first finite state machine locates in the macro memory a sequence of flash control commands associated with the macro identifier of the command and sequentially outputs the first flash control command in the sequence to the second finite state machine. And the second finite state machine drives each of the plurality of control outputs based on corresponding values in the first flash control command for the duration specified in the current flash control command. In some examples, the apparatus comprises a dynamic value selector with an output coupled to the second finite state machine, a selection input driven by a dynamic value indicator of a current flash control command, a first selectable input coupled to the macro memory to receive values from a current flash control command, and a second selectable input coupled to a buffer in the first finite state machine for storing a dynamic value specified in the command received from the channel processor. When the dynamic value indicator is asserted, the second finite state machine drives a plurality of additional outputs based on the dynamic value stored in the buffer, the additional outputs for driving additional inputs on the flash target. When the dynamic value indicator is not asserted, the second finite state machine drives the plurality of additional outputs based on a plurality of values in the current flash control command. In some examples, the apparatus comprises a control selector with an output coupled to the second finite state machine, a selection input driven by the first finite state machine, a first input driven by a plurality of values in the command from the channel processor, and a second input driven by values in the first flash control command. In some examples, when the control selector selection input is asserted, the second finite state machine drives the plurality of target control values in a predetermined sequence corresponding to the command from the channel processor. In some examples, the control selector selection input is coupled to a pass-through input to the second finite state machine. In some examples, the apparatus comprises an initialization processor coupled to a non-volatile memory, the initialization processor for copying each of a sequence of one or more flash control commands from the non-volatile firmware memory into the macro memory. In some examples, the second finite state machine comprises predetermined sequences for instructing a flash target to perform a function from the set: burst read, burst write, and pass-through, wherein when the function is burst read, the control finite state machine drives at least a first portion of the plurality of outputs according to a first predetermined timing sequence, when the function is burst write, the control finite state machine drives at least a second portion of the plurality of outputs according to a second predetermined timing sequence, and when the function is pass-through, the control finite state machine drives each of the plurality of control outputs based on corresponding values in the first flash control command for the duration specified in the current flash control command. In some examples, the plurality of control outputs corresponds one to one with the control inputs of the flash target.

In some examples, a method comprises receiving a command from a channel processor, the command comprising a macro identifier; locating in a macro memory a sequence of flash control commands associated with the macro identifier, each flash control command including a duration and a plurality of target control values corresponding to a plurality of control inputs on a flash target; and executing a first flash control command in the sequence by reading the first flash control command from the macro memory, and driving, for at least the first flash control command duration, the plurality of target control values from the first flash control command to a plurality of control outputs coupled to the plurality of control inputs on the flash target. In some examples, the command from the channel processor includes a dynamic value and the method comprises storing the dynamic value in a buffer, executing a current flash control command in the sequence by reading the current flash control command of the sequence, the current flash control command including a dynamic data indicator, while the dynamic value indicator is asserted, driving the dynamic value from the buffer to a plurality of additional outputs coupled to an additional plurality of inputs on the flash target, and while the dynamic value indicator is not asserted, driving a static value from the current flash control command of the sequence to the plurality of additional outputs. In some examples, the method comprises a second finite state machine driving the plurality of control outputs and the plurality of additional outputs, sending a current flash control command from the macro memory to the second finite state machine, and sending the command from the channel processor to the second finite state machine. In some examples, the method comprises the first finite state machine identifying the command as a macro command, and causing the second finite state machine to pass through the current flash control command to the control outputs. In some examples, the method comprises the first finite state machine identifying the command as a stock command, and causing the second finite state machine to decode and execute the stock command. In some examples, the stock command is a burst read command or a burst write command. In some examples, each supported stock command is associated in the second finite state machine with a fixed sequence of target control values each of which corresponds to one of the plurality of control inputs on the flash target. In some examples, the method comprises copying flash control commands from a nonvolatile memory to the macro memory. In some examples, each input of the flash target is driven by a bit from the current flash control command or a bit from the buffered dynamic value.

In some examples, a configurable flash memory controller is provided comprising a channel processor to dispatch commands for controlling a flash memory target; a first finite state machine with a command input for receiving a command from the channel processor, the command comprising a macro identifier and an indication the command is a macro command; a macro memory RAM for storing a plurality of flash control commands, each flash control command including a target control value corresponding to each input on the flash target and a duration; and a plurality of outputs corresponding to a set of inputs on the flash target. The controller responsive to an indication that the flash control command is a macro command, the first finite state machine to locate a sequence of flash control commands associated with the macro identifier and, for each flash control command in the sequence, to read a current flash control command of the sequence, and drive the plurality of outputs based on the current flash control command target control values for at least the first flash control command duration. In some examples, the controller comprises a second finite state machine encoding a predetermined sequence of flash control commands for driving the plurality of outputs in a sequence to cause the flash target to perform at least one of a burst read or a burst write. In some examples, the controller comprises a non-volatile memory to store sequences of flash control commands.

DETAILED DESCRIPTION

Figure 1:
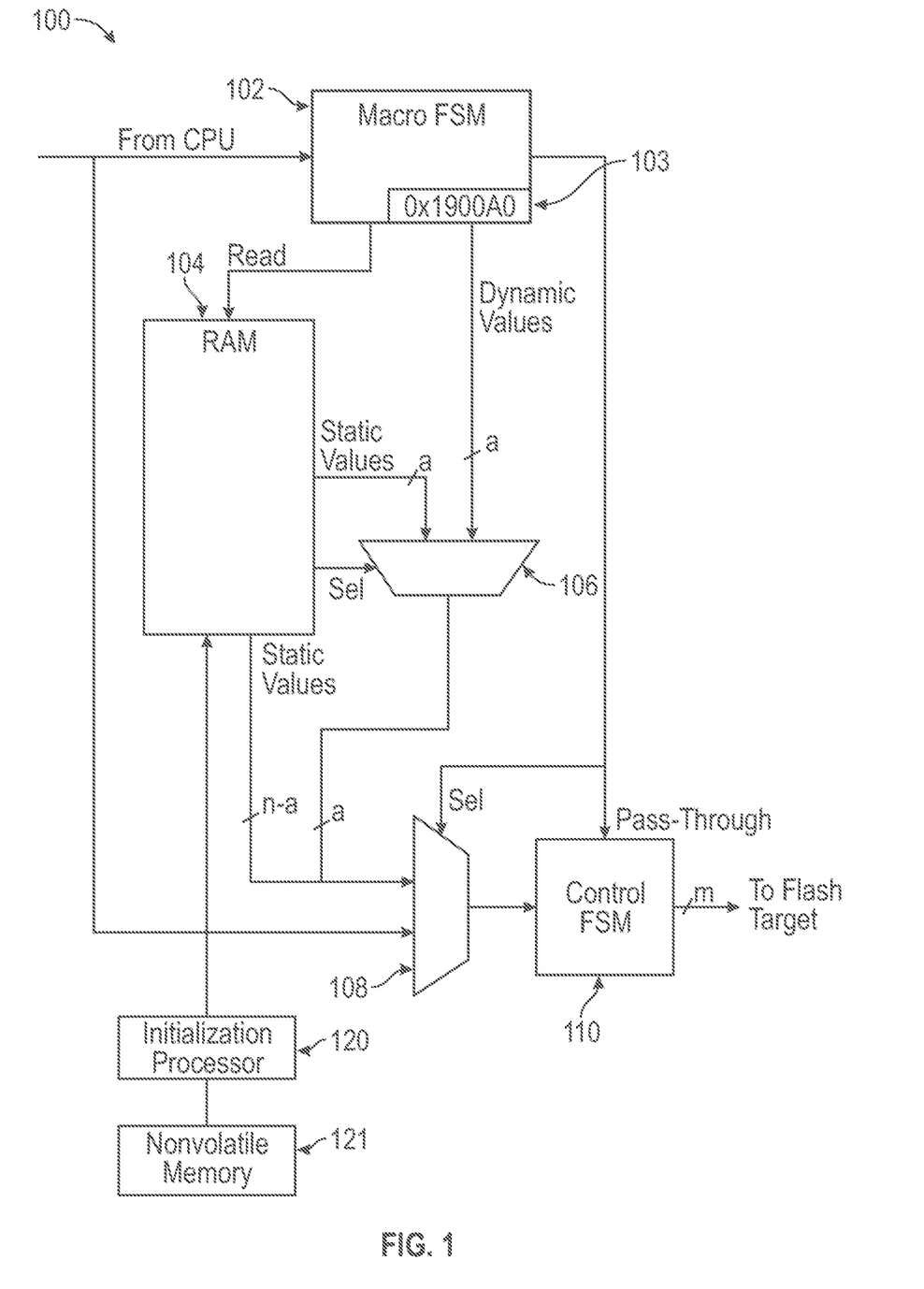
FIG. 1 is an illustration of a system for issuing commands to a flash memory, according to examples of the present disclosure.

FIG. 1 is an illustration of a system for issuing commands to a flash memory, according to examples of the present disclosure. System 100 comprises macro finite state machine (FSM) 102, RAM 104, multiplexers (muxes) 106 and 108, and control FSM 110 along with various busses and control lines as illustrated. Macro FSM accepts a macro command from channel processor (CPU) containing a macro address, a macro length, and (in some circumstances) a dynamic value such as an address or a portion of an address. Macro FSM stores any dynamic value in register 103 for later use. Macro FSM then sequentially fetches each instruction of the macro from RAM 104. Macro FSM executes an instruction by reading the instruction from RAM 104 and selecting the RAM input of mux 108 to pass the instruction to control FSM 110 and ultimately to the flash target. Some instructions may require dynamic data, e.g., an instruction to load an address of a flash block to erase. When an instruction from RAM 104 requires dynamic data, the select line on mux 106 is set to draw a bits of data from register 103 and the remaining n-a bits of data from RAM 104. Some instructions may require static data from RAM 104. When an instruction from RAM 104 requires static data from RAM 104, it may include a field specifying the location in RAM 104 of the static data to include. The select line on mux 106 is reset to draw a bits from RAM 104. The number of bits may be configurable. In some examples, an instruction may select one, two, or three bytes of either static or dynamic data to send to the flash target. The term data as used here could mean an address or part of an address to communicate to the flash target. Control FSM 110 is a finite state machine designed to efficiently implement burst operations, e.g., burst read and burst write, that may enable transfers on both the rising and falling edge of a clock signal. In an example burst write operation to a DDR flash target, control FSM 110 transfers data on the data (DQ) lines at each rising and trailing edge of the data strobe (DQS output). Control FSM 110 drives DQS in sync with the data output to the DQ lines. In an example burst read operation, control FSM 110 receives data on the DQ lines at each rising and trailing edge of DQS where DQS is driven by the flash target.

When the pass-through signal is asserted on control FSM 110, control FSM 110 passes values directly to a flash target control and address lines for a specified duration. In some examples, control FSM 110 may interpret (e.g., by decoding an operation code) one or more of its input lines as a pass-through signal. Control FSM 110 has m outputs coupled to all m inputs of a target flash module. Further, RAM 104 drives n inputs to control FSM 110 including n inputs corresponding to the n inputs of the target flash module. The n inputs to control FSM 110 include at least m bits of data and may additionally include signals to Control FSM 110 that are not passed to the flash target. This arrangement allows macro FSM 102 to sequence the n inputs of the target flash module to execute a macro-level command. In some examples, the logic of macro FSM 102 and control FSM 110 are combined. In some examples, the pass-through signal is driven by the operation type such that burst reads and rights are handled by control FSM 110 and other operations are handled by macro FSM 102.

In some examples, initialization processor 120 is coupled to nonvolatile memory 121 and to RAM 104. Initialization processor 120 may load a set of macros into memory 104 as part of the initialization of system 100. When a new flash target is introduced, a memory specialist can prepare and tune a set of macro commands to augment the existing library of macros stored in nonvolatile memory 121. These new set of macro commands will be loaded the next time system 100 is initialized. In another example, a memory specialist may discover a workaround for a problem with a particular flash target and may update one or more macros in the macro library. A workaround might require, for example, a longer setup and hold time for one or more steps in a command.

Figure 2:
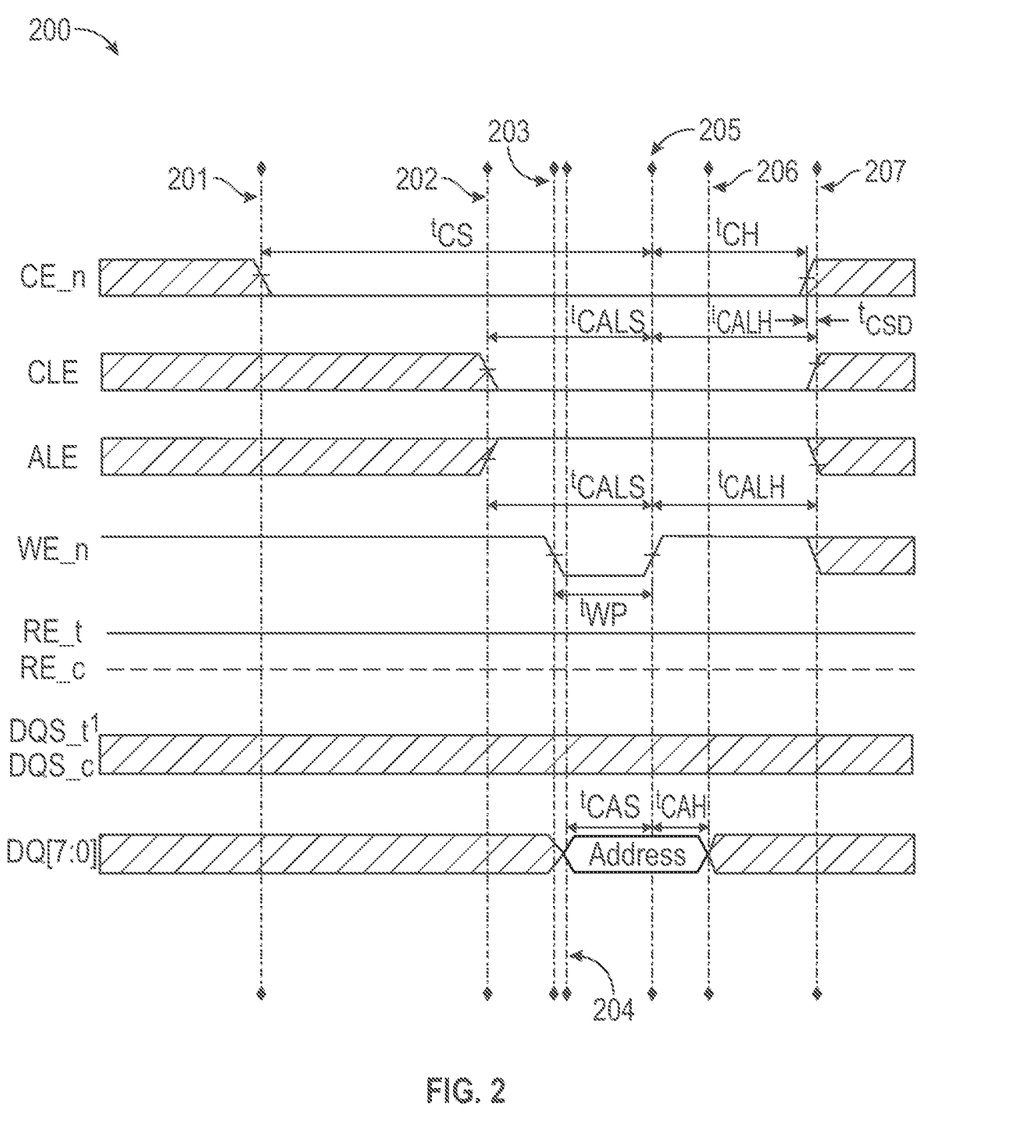
FIG. 2 is an illustration of signal timing provided to a flash memory, according to examples of the present disclosure.

FIG. 2 is an illustration of signal timing provided to a flash memory, according to examples of the present disclosure. Signals are timed according to the table of instructions in FIG. 3. Timing diagram 200 includes times 210-206 corresponding to the timing of instructions issued by macro FSM 102 in executing one example macro. CE_n is a chip enable signal with inverted logic. CLE is a command latch enable signal. ALE is an address latch enable signal t. WE_n is a write enable signal with inverted logic. RE_t and RE_c form a differential pair (with true and complementary logic values, respectively) representing a read enable signal. DQS_t and DQS_c form a differential pair representing a data strobe signal. DQ[0:0] is an eight bit data bus that may carry address or data values.

Figure 3:
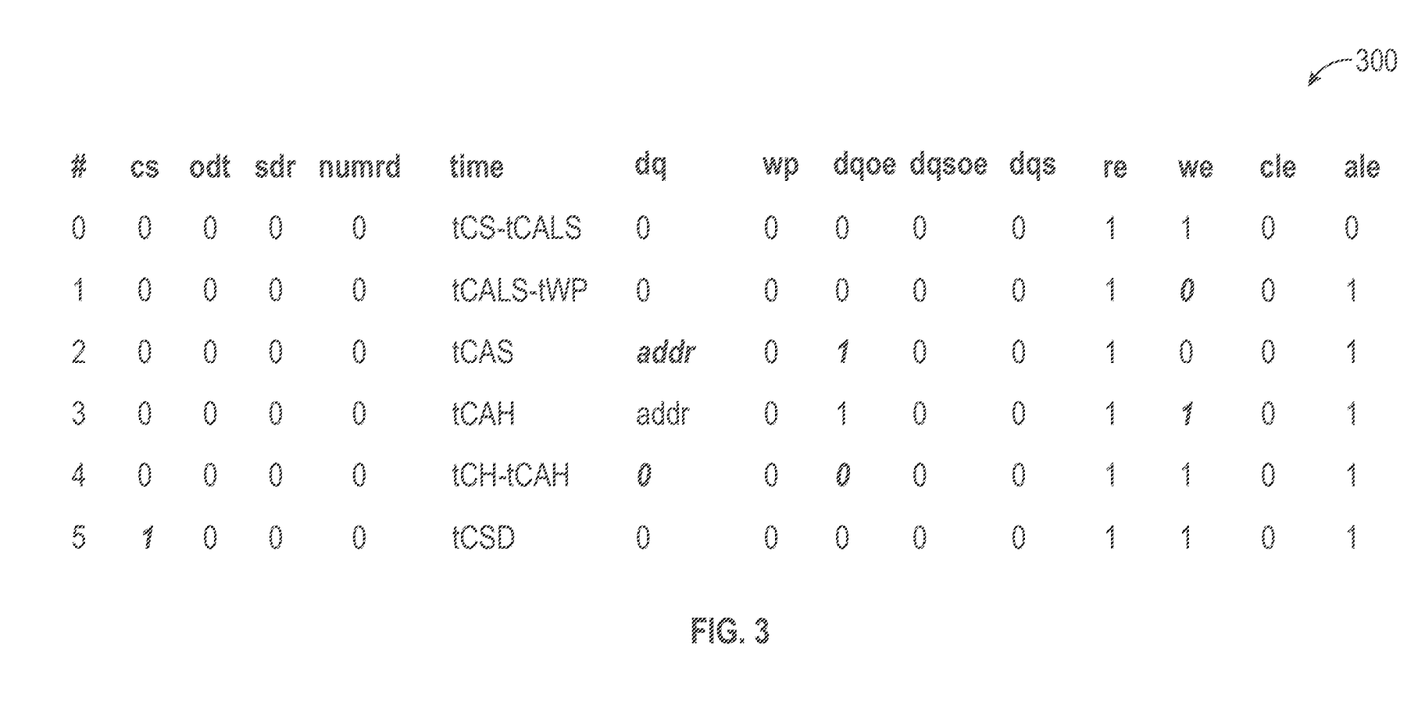
FIG. 3 is a table of instructions stored in a macro memory according to examples of the present disclosure.

FIG. 3 is a table of instructions stored in a macro memory according to examples of the present disclosure. Each instruction includes values corresponding to each input of the flash memory target. Each instruction also includes a time duration for holding those values on the flash memory inputs. Each instruction also includes an indicator of whether dynamic data from register 103 should override the data bus (dq) lines. Instruction 0x00 is executed at time 201 and the values specified are held for the time between times 201 and 202 (i.e., $t_{CS}$ minus $t_{CALS}$). Instruction 0x01 is executed at time 202, and the values specified are held for the time between times 202 and 203 (i.e., $t_{CALS}$ minus $t_{WP}$). Instruction 0x02 is executed at time 203, and the values specified are held for the time between times 203 and 204 (i.e., $t_{CAS}$). Instruction 0x03 is executed at time 204, and the values specified are held for the time between times 204 and 205 (i.e., $t_{CAH}$). Note instructions 0x02 and 0x03 also pass the address value embedded in the invocation of the macro by asserting DQOE. Asserting DQOE selects the dynamic values from register 103 to pass along to the flash target instead of static values from RAM 104. Instruction 0x04 is executed at time 205 and the values specified are held for the time between times 205 and 206 (i.e., $t_{CH}$ minus $t_{CAH}$). Instruction 0x05 is executed at time 206 and the values specified are held for the time between times 206 and 207 (i.e., $t_{CSD}$).

Figure 4:
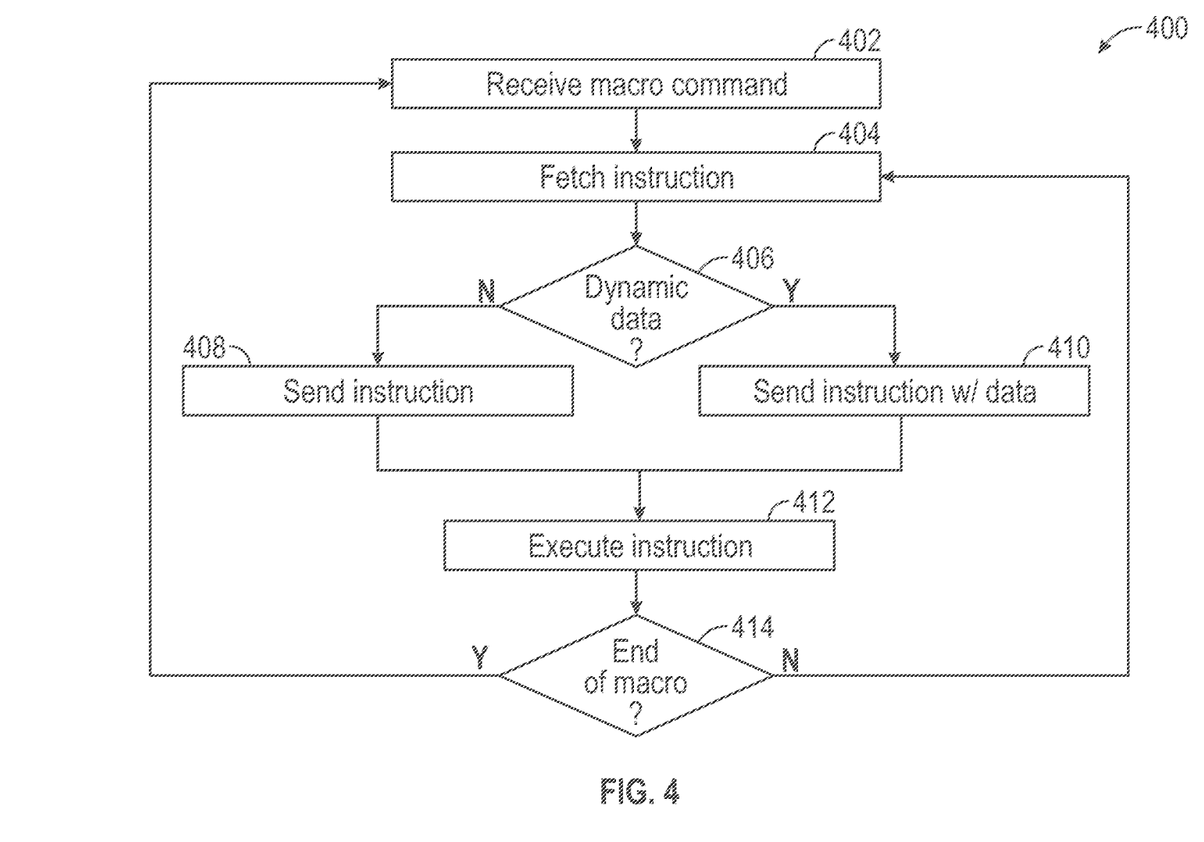
FIG. 4 is a flowchart of a method for issuing commands to a flash memory, according to certain examples of the present disclosure.

FIG. 4 is a flowchart of method 400 for issuing commands to a flash memory, according to certain examples of the present disclosure. At block 402, channel processor sends a macro command to macro FSM 102 identifying a macro to execute and providing dynamic data (e.g., a partial or complete address value) if applicable. Macro FSM 102 receives the macro identifier and stores any dynamic data in register 103. In some examples, RAM 104 includes a lookup table identifying the start and end addresses for each macro sequence of instructions. At block 404, macro FSM 102 looks up the macro by its identifier and identifies the first instruction of the macro as the current instruction. At block 404, macro FSM 102 fetches the current instruction and causes RAM 104 to output n bits of data, including a bit for each input of the flash memory target and bits specifying an amount of time to hold the flash target inputs at the specified values. At block 406, macro FSM determines whether the current instruction requires dynamic data. If dynamic data is not required, at block 408, macro FSM selects a bits from RAM 104 via mux 106 to join n-a bits from RAM 104 as inputs to mux 108. If dynamic data is required, macro FSM selects a bits from register 103 via mux 106 to join n-a bits from RAM 104 as inputs to mux 108. At block 412, macro FSM 102 selects the macro instruction from RAM 104 (possibly including a bits from register 103) to send to control FSM 110 along with a pass-through signal to pass m bits to the flash target for the specified amount of time. At block 414, if the end of the macro has been reached, macro FSM 102 returns to block 402. At block 414, if the end of the macro has not been reached, the current instruction pointer is incremented before returning to block 404.

Figure 5:
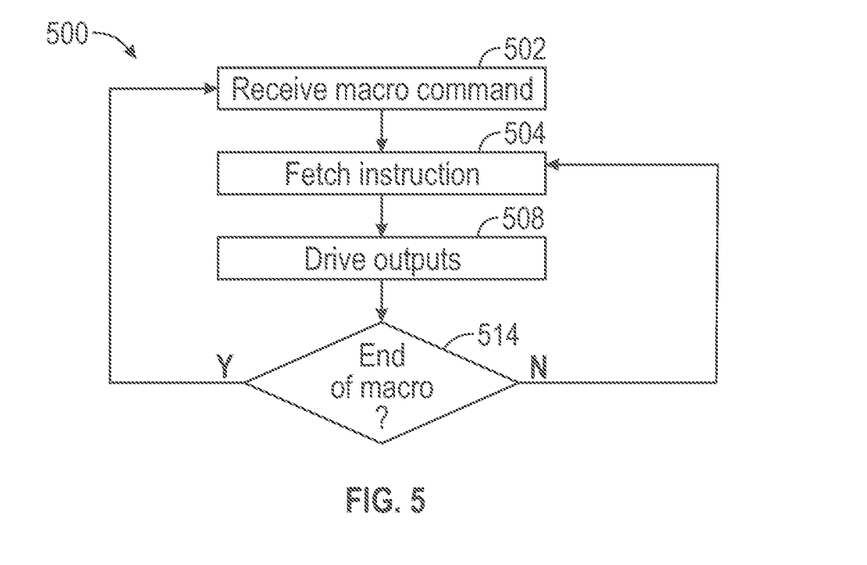
FIG. 5 is a flowchart of a method for issuing commands to a flash memory, according to certain examples of the present disclosure.

FIG. 5 is a flowchart of method 500 for issuing commands to a flash memory, according to certain examples of the present disclosure. At block 502, macro FSM 102 receives a macro command from a channel processor. Macro FSM 102 locates the macro sequence in RAM 104. At block 504, macro FSM 102 addresses the first macro instruction in the sequence and asserts the read enable on RAM 104. At block 508, the first macro instruction is passed through to and driven on the output lines to the flash memory target. If the macro includes additional instructions in the sequence, the method returns to block 504 and the macro instruction counter is advanced to fetch the next instruction. Otherwise, macro FSM 102 returns to receive the next macro command at block 502.

Figure 6:
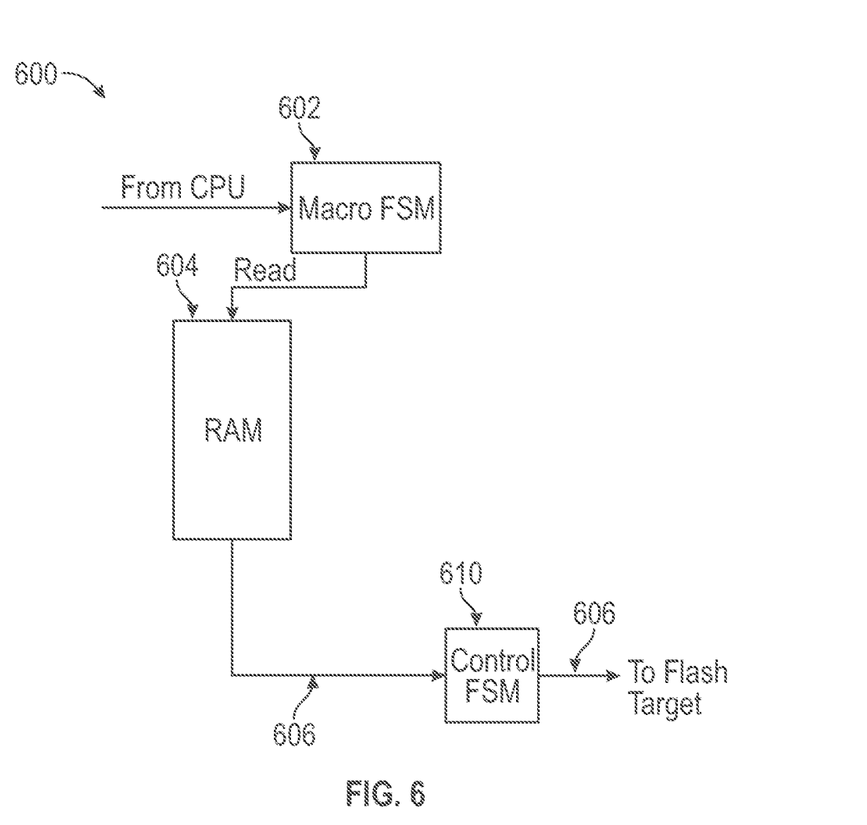
FIG. 6 is an illustration of a system for issuing commands to a flash memory, according to examples of the present disclosure.

FIG. 6 is an illustration of a system for issuing commands to a flash memory, according to examples of the present disclosure. System 600 includes macro FSM 602, RAM 604, control FSM 610, and outputs 606 to the inputs of a flash target. Macro FSM 602 may be implemented in software, hardware, or configurable logic to perform the method steps of examples disclosed herein. Macro FSM 602 accepts commands from a channel processor and can identify a macro identifier in a particular command. Macro FSM 602 identifies the first macro command of a sequence corresponding to that macro identifier. And macro FSM 602 sends the first macro command to control FSM 610. Control FSM 610 bypasses its internal hard-coded command sequences and drives outputs 606 with values specified in the first macro command. After the first macro command values have been output for the duration specified in that macro command, control FSM 610 signals to macro FSM 602 to fetch the next macro command in the sequence.

Figure 7:
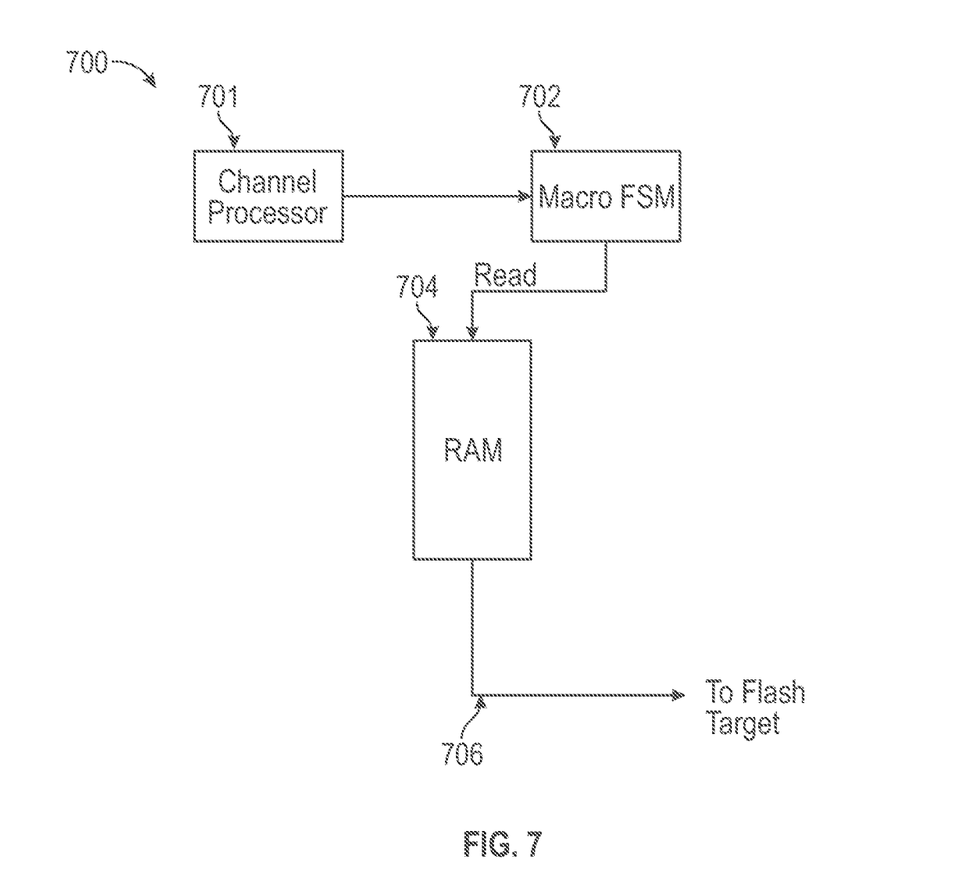
FIG. 7 is an illustration of a system for issuing commands to a flash memory, according to examples of the present disclosure.

FIG. 7 is an illustration of a system for issuing commands to a flash memory, according to examples of the present disclosure. System 700 includes channel processor 701, macro FSM 702, RAM 704, and outputs 706 to the inputs of a flash target. Channel processor is a processor for managing and coordinating reads and writes to the flash memory storage system. Channel processor 701 may be a general purpose processor, for example a RISC processor. Channel processor 701 may execute instructions out of a memory and edit data structures in a memory to allow it to prioritize reads and writes to achieve performance guarantees, distribute reads/writes across flash targets to distribute workload and heat, and perform other tasks/optimizations. Macro FSM 702 may be implemented in software, hardware, or configurable logic to perform the method steps of examples disclosed herein. Macro FSM 702 accepts commands from a channel processor and can identify a macro identifier in a particular command. Macro FSM 702 identifies the first macro command of a sequence corresponding to that macro identifier. And macro FSM 702 sends the first macro command to drives outputs 706 with values specified in the first macro command. After the first macro command values have been output for the duration specified in that macro command, macro FSM 702 fetches the next macro command in the sequence and continues the method.

Although example embodiments have been described above, other variations and embodiments may be made from this disclosure without departing from the spirit and scope of these embodiments.

What is claimed is:
1. An apparatus, comprising:
   a first finite state machine comprising a command input to receive a command from a channel processor, the command comprising a macro identifier;

a macro memory to store a plurality of flash memory control commands, each flash memory control command comprising a plurality of target control values to control a flash memory target and a duration;

a second finite state machine comprising a plurality of control outputs each of which corresponds to one of a plurality of control inputs on the flash memory target;

an output coupled to the second finite state machine, a selection input driven by the first finite state machine, a first input driven by a plurality of values in the command from the channel processor, and a second input driven by values in the first flash memory control command, wherein in response to the received command, the first finite state machine locates in the macro memory a sequence of flash memory control commands associated with the macro identifier of the command and sequentially outputs the first flash memory control command in the sequence to the second finite state machine; and wherein the second finite state machine drives each of the plurality of control outputs based on corresponding values in the first flash memory control command for the duration specified in the first flash memory control command.

2. The apparatus of claim 1, comprising:
a dynamic value selector comprising:
an output coupled to the second finite state machine,
a selection input driven by a dynamic value indicator of a current flash memory control command,
a first selectable input coupled to the macro memory to receive values from the current flash memory control command, and
a second selectable input coupled to a buffer in the first finite state machine for storing a dynamic value specified in the command received from the channel processor;
wherein when the dynamic value indicator is asserted, the second finite state machine drives a plurality of additional outputs based on the dynamic value stored in the buffer, the additional outputs for driving additional inputs on the flash memory target, and
wherein when the dynamic value indicator is not asserted, the second finite state machine drives the plurality of additional outputs based on a plurality of values in the current flash memory control command.

3. The apparatus of claim 2, wherein when the control selector selection input is asserted, the second finite state machine drives the plurality of target control values in a predetermined sequence corresponding to the command from the channel processor.

4. The apparatus of claim 2, wherein the control selector selection input is coupled to a pass-through input to the second finite state machine.

5. The apparatus of claim 1, comprising: an initialization processor coupled to a non-volatile memory, the initialization processor for copying each of a sequence of one or more flash memory control commands from a non-volatile firmware memory into the macro memory.

6. The apparatus of claim 1, wherein the second finite state machine comprises predetermined sequences for instructing a flash memory target to perform a function from the set: burst read and burst write, wherein:
when the function is burst read, the control finite state machine drives at least a first portion of the plurality of outputs according to a first predetermined timing sequence, and
when the function is burst write, the control finite state machine drives at least a second portion of the plurality of outputs according to a second predetermined timing sequence.

7. The apparatus of claim 1, wherein the plurality of control outputs corresponds one to one with the control inputs of the flash memory target.

8. The apparatus of claim 1, wherein:
when the channel processor command indicates a pass-through function, the second finite state machine drives each of the plurality of control outputs based on corresponding values in the channel processor command for the duration specified in the channel processor command.

9. A method, comprising:
receiving a first command from a channel processor, the first command comprising a macro identifier for locating in a macro memory a sequence of flash memory control commands associated with the macro identifier, each flash memory control command including a duration and a plurality of target control values corresponding to a plurality of control inputs on a flash memory target;
executing a first flash memory control command in the sequence by:
reading the first flash memory control command from the macro memory, and
driving, for at least the first flash memory control command duration, the plurality of target control values from the first flash memory control command to a plurality of control outputs coupled to the plurality of control inputs on the flash memory target; and
receiving a second command from the channel processor and executing the second command by driving the plurality of target control values from the second command to the plurality of control outputs coupled to the plurality of control inputs on the flash memory target.

10. The method of claim 9, wherein the command from the channel processor includes a dynamic value, the method comprising:
storing the dynamic value in a buffer,
executing a current flash memory control command in the sequence by:
reading the current flash memory control command of the sequence, the current flash memory control command including a dynamic data indicator,
while the dynamic value indicator is asserted, driving the dynamic value from the buffer to a plurality of additional outputs coupled to an additional plurality of inputs on the flash memory target, and
while the dynamic value indicator is not asserted, driving a static value from the current flash memory control command of the sequence to the plurality of additional outputs.

11. The method of claim 10, wherein for at least a period of time each input of the flash memory target is driven by a bit from the current flash memory control command or a bit from the buffered dynamic value.

12. The method of claim 9, comprising:
a finite state machine driving the plurality of control outputs and the plurality of additional outputs,
sending a current flash memory control command from the macro memory to the finite state machine, and
sending the second command from the channel processor to the finite state machine.

13. The method of claim 12, comprising:
causing a second finite state machine to decode and execute the second command.

14. The method of claim 13, wherein the second command is a burst read command or a burst write command.

15. The method of claim 13, wherein the second command is associated in a second finite state machine with a fixed sequence of target control values each of which corresponds to one of the plurality of control inputs on the flash memory target.

16. The method of claim 9, comprising copying flash memory control commands from a nonvolatile memory to the macro memory.

17. The method of claim 9, comprising:
determining the second command is a pass-through command.

18. A configurable flash memory controller comprising:
a channel processor to dispatch commands for controlling a flash memory target;
a first finite state machine with a command input for receiving a command from the channel processor, the command comprising a macro identifier and an indication the command is a macro command;
a macro memory RAM for storing a plurality of flash memory control commands, each flash memory control command including a target control value corresponding to each input on the flash memory target and a duration; and
a plurality of outputs corresponding to a set of inputs on the flash memory target;
wherein, responsive to an indication that the flash memory control command is a macro command, the first finite state machine to locate a sequence of flash memory control commands associated with the macro identifier and, for each flash memory control command in the sequence, to:
read a current flash memory control command of the sequence, and
drive the plurality of outputs based on the current flash memory control command target control values for at least the first flash memory control command duration, and
wherein, responsive to an indication that the flash memory control command should be passed through, drive the plurality of outputs based on the flash memory control command.

19. The configurable flash memory controller of claim 18, comprising a second finite state machine including a predetermined sequence of flash memory control commands for driving the plurality of outputs in a sequence to cause the flash memory target to perform at least one of a burst read or a burst write.

20. The configurable flash memory controller of claim 18, comprising a non-volatile memory to store sequences of flash memory control commands.

* * * * *